INVENTOR
CLAYTON JAMES

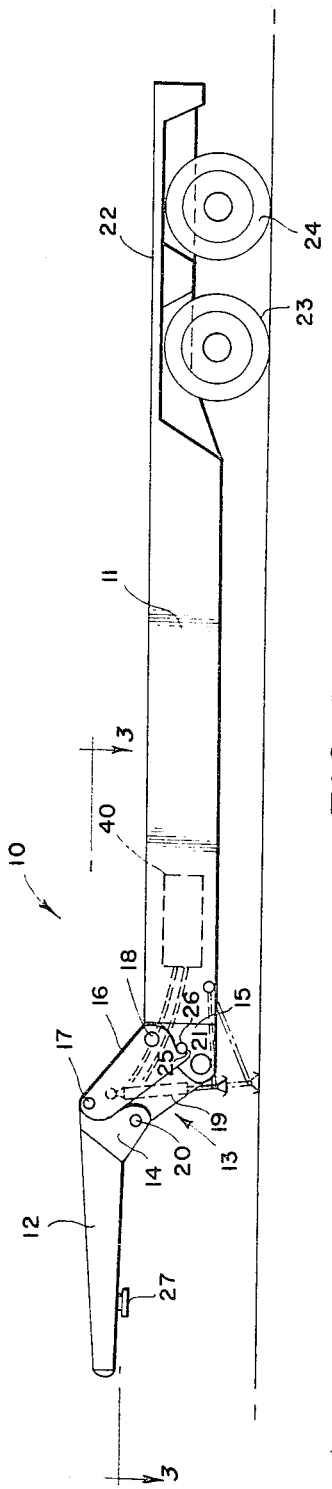
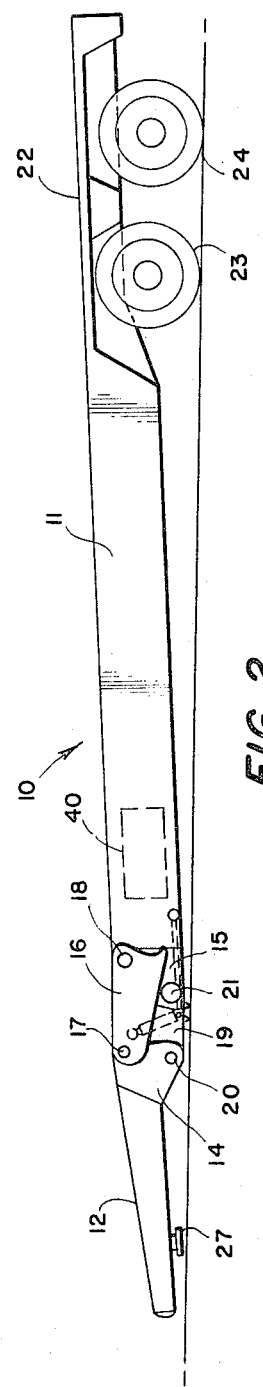

Dec. 31, 1968  C. JAMES  3,419,169
POWER ACTUATED FOLDING GOOSENECK TRAILER
Filed Dec. 30, 1966  Sheet 3 of 3
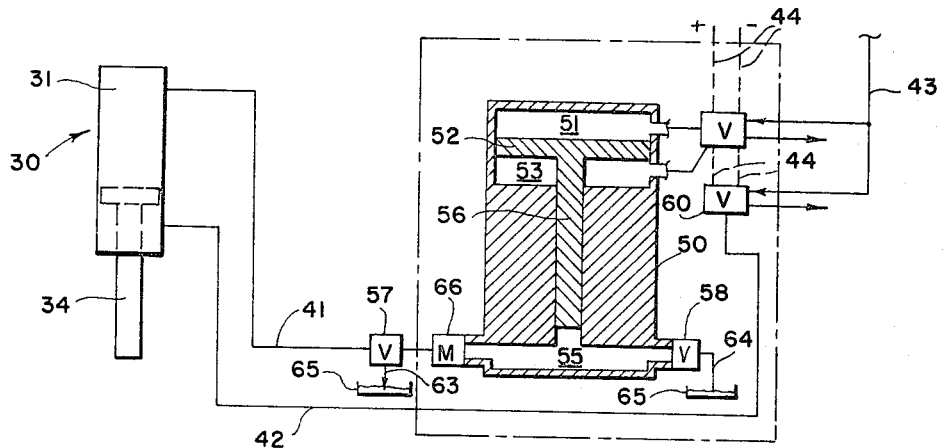
FIG. 5
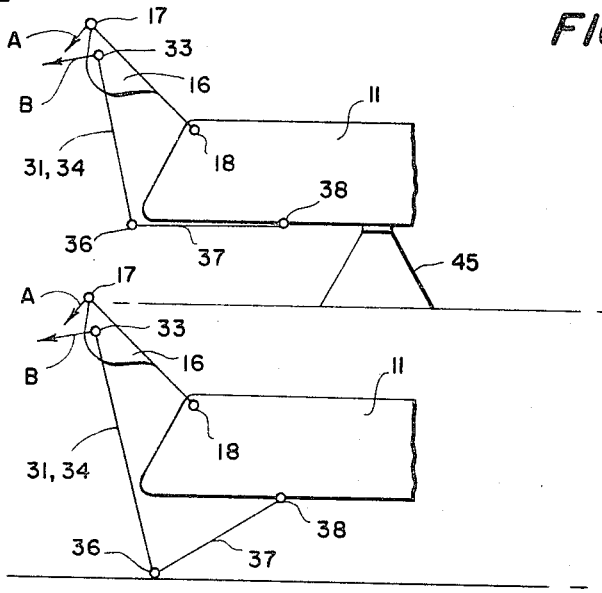
FIG. 6A
FIG. 6B
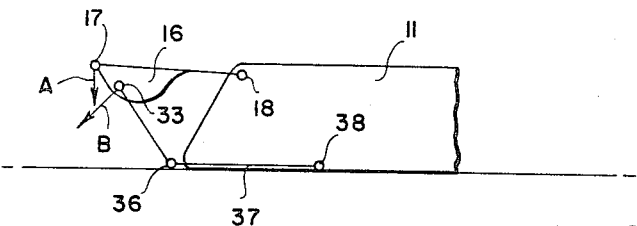
FIG. 6C
INVENTOR
CLAYTON JAMES
BY Larson and Taylor
ATTORNEYS

United States Patent Office 3,419,169
Patented Dec. 31, 1968

3,419,169
POWER ACTUATED FOLDING GOOSENECK
TRAILER
Clayton James, Elk Point, S. Dak., assignor to Load King Trailer Company, Elk Point, S. Dak., a corporation of South Dakota
Filed Dec. 30, 1966, Ser. No. 606,163
7 Claims. (Cl. 214—506)

ABSTRACT OF THE DISCLOSURE

A parallel link folding gooseneck trailer having an arrangement for raising and lowering the platform with or relative to the bed. The arrangement includes an extensible link extending downwardly from the parallel links and a rigid rod connecting the bed to the lower end of the extensible link. Power means for operating the extensible and retractable link may comprise a hydraulic power source mounted on the bed.

---

This invention relates generally to a folding gooseneck trailer of the type having a hitch platform connected to a bed by a set of parallel links and adapted for connection to a towing vehicle, and in particular it relates to such a folding gooseneck trailer having a power actuated means for raising and lowering the hitch platform relative to the bed and for raising and lowering the trailer bed itself.

As has been known heretofore, the folding gooseneck trailer includes a parallel link connection between the flat trailer bed and the hitch platform to permit the hitch platform to be raised relative to the flat trailer bed for connecting the hitch platform to a towing vehicle and to be lowered relative to the flat trailer bed to serve as a loading ramp. The purpose of the parallel link connection, as opposed to a single link or single pivot connection, is to keep the hitch platform generally parallel to the flat bed in at least the raised position, and possibly in the lowered, or loading position.

The present invention is concerned with a power actuated mechanism mounted on the trailer which serves the dual purpose of raising and lowering the hitch platform relative to the flat bed and raising and lowering the flat bed itself relative to the ground.

To discuss the power means presently employed it is convenient to divide known folding gooseneck trailers into two types classified by the position which the flat bed assumes when the hitch platform is lowered to the loading position. In the first type the flat bed remains substantially horizontal throughout loading (that is, the same as its travelling position), while the hitch platform is lowered to the ground. See, for example, the Townsend Patent No. 2,431,436, issued Nov. 25, 1947. In the second type the front end of the flat bed is tilted downwardly as the hitch platform is lowered to loading position. See, for example, the Martin Patent No. 2,772,008 issued Nov. 27, 1956.

In the first type of trailer the problem of designing a power means is minimal since it is only necessary to provide a power mechanism for moving the hitch platform relative to the flat bed. This may be accomplished by providing an extendible link such as a hydraulic piston and cylinder between the flat bed and the parallel link system.

In the second type of trailer, however, the problem is far more complex since it is necessary not only to raise and lower the hitch platform relative to the bed, but also to raise and lower the bed itself relative to the ground. To my knowledge no one has heretofore provided a satisfactory power actuated means mounted on the trailer for performing the dual function of raising and lowering both the hitch platform and the flat bed. While trailers of this second type have employed a hydraulic cylinder mounted on the trailer for raising and lowering the hitch platform, it was necessary to employ an external means such as a power winch attached to the towing unit and a cable from the winch to raise and lower the flat bed.

Thus, it is a purpose of the present invention to provide a new and substantially improved folding gooseneck trailer which includes in its construction a power actuated mechanism for both raising and lowering the hitch platform and raising and lowering the flat bed without the need for any external device such as the winch and cable previously used.

The power actuated mechanism of the present invention may be controlled by pressure fluid or electrical energy, and the source of power may be located directly on the trailer itself. Alternatively, the source of power may be external to the trailer, for example, by compressed air in the braking system of the towing unit or by electricity in the electrical system to the towing unit.

The trailer itself comprises a hitch platform and a flat bed trailer supported at its rearward end on wheels about which the forward end of the flat bed can pivot. The hitch platform is connected to the flat bed by at least one set, but usually a plurality of sets of parallel links, each set including an upper link and a lower link, the links of a set being arranged to form a parallelogram so that the hitch platform remains generally parallel to the plane of the flat bed in the raised and lowered positions.

To this basic structure is added the power actuated mechanism of the present invention. This mechanism includes a longitudinally extensible link pivotally connected at its upper end to one of the parallel links and pivotally connected at its lower end to the forward end of a rigid connecting rod, the said upper and lower extensible link connections allowing pivotable movement of said link about axes parallel to those axes about which the parallel links rotate. The rigid connecting rod is in turn pivotally connected at its rearward end to the flat bed portion of the trailer. The extensible link may be, for example, a hydraulic or pneumatic piston and cylinder unit. However, because of the incompressibility of liquid, a hydraulic unit is preferred.

There is also provided a power source means for supplying fluid under pressure to the extensible link and a control means for controlling the flow of pressure fluid to and from the extensible link. The power source means and the control means may take many different forms. For example, in one operative embodiment of the invention employing a hydraulic piston and cylinder as the extensible link, the power source means may comprise a high pressure fluid pump mounted directly on the flat bed portion of the trailer and fluid lines connected between the pump and the hydraulic cylinder for carrying pressure fluid to and from the cylinder. The pump may then be selectively controlled by control means such as a compressor operated by compressed air from the brake system of the towing unit. Valves of the compressor may be manually controlled or they may be of the selenoid type and operated by electric power derived from the towing unit. Alternatively, the extensible link may be a pneumatic piston and cylinder unit in which case the high pressure fluid may be taken directly from a high pressure air system in the towing unit itself. The flow of this high pressure air from the towing unit to the piston and cylinder unit of the extensible link may then be controlled either by pneumatically operated valves controlled from the same high pressure system in the towing unit; or the flow of high pressure air to the piston and cylinder may be controlled by selenoid operated valves selectively regulated by electric energy transmitted from the towing unit to the valves. Of course, other control arrangements would be apparent to those skilled in the art.

Relative movement between the hitch platform and the bed is provided in the following manner. The extensible link rotates about its pivotable connection to the forward end of the connecting rod. Similarly, the parallel link to which the upper end of the extensible link is pivotally connected rotates about its pivot connection to the flat bed trailer. However, since the upper parallel link and the extensible link do not follow the same path, it follows that the parallel link cannot move while the piston and cylinder unit is holding the extensible link stationary. By operating the piston and cylinder unit to extend the extensible link, this link will exert a force on the parallel link thereby urging the parallel link upwardly about its pivot connection to the flat bed trailer, thereby raising the hitch platform. The hitch platform is lowered by a reverse operation of the piston and cylinder unit, contracting the extensible link to allow the weight of the hitch platform and the parallel links to carry the hitch platform downwardly, its motion being checked by the engagement of the parallel link with the now contracting extensible link.

Thus, it is an object of this invention to provide an improved folding gooseneck trailer which overcomes disadvantages of previous folding gooseneck trailers.

It is another object of this invention to provide an improved folding gooseneck trailer having a power actuated means mounted thereon for raising and lowering the flat bed thereof.

It is another object of this invention to provide an improved folding gooseneck trailer having a power actuated means mounted thereon for raising and lowering both the hitch platform relative to the flat bed and the flat bed relative to the ground.

It is still another object of this invention to provide a power actuated means for raising and lowering the hitch platform of a folding gooseneck trailer, said means including a longitudinally extensible link pivotally connected at its upper end to one of the parallel links between the hitch platform and the bed and pivotally connected at its lower end to one end of a connecting rod which is attached at its other end to the trailer bed.

Another object of this invention is to provide a folding gooseneck trailer which is more economical to operate than previous gooseneck trailers since the need for external power means is eliminated.

Other objects and the attendant advantages of the present invention will become apparent from the detailed description to follow together with the accompanying drawings which describe and show a preferred embodiment of the invention. However, it is to be understood that this preferred embodiment is described and shown only for purposes of illustration and is not intended to limit the scope of the invention as defined in the appended claims.

FIGURE 1 illustrates a folding gooseneck trailer including the power actuated means of the present invention.

FIGURE 2 illustrates the folding gooseneck trailer of FIGURE 1 in the loading position.

FIGURE 5 is a schematic illustration of a typical power control unit.

Figure 3:
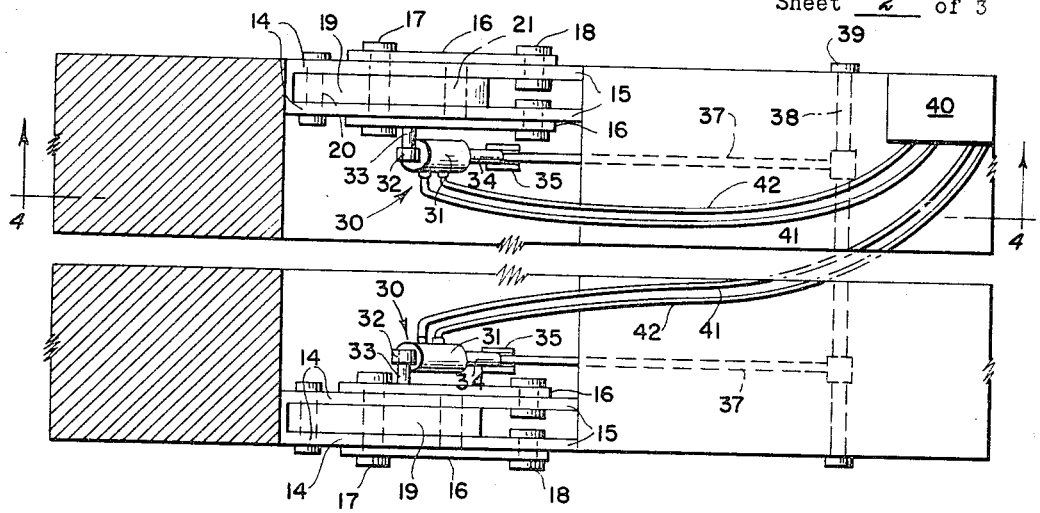
FIGURE 3 is a plan view of a portion of the trailer taken along line 3—3 of FIGURE 1; by showing the link extended.

FIGURES 6A, 6B, and 6C are schematic drawings illustrating the operation of the invention.

Referring to FIGURES 1 and 2 there is shown a flat bed trailer 10 of the folding gooseneck type. FIGURE 1 illustrates the trailer in the raised position while FIGURE 2 illustrates the trailer in the lower, or loading position.

The trailer includes a flat bed 11 mounted at its rearward end 22 on wheels 23 and 24. Comparing FIGURES 1 and 2 it can be seen that the flat bed 11 is mounted to pivot about its connection with the wheels 23 and 24. The front of the trailer includes a hitch platform 12 including a pin 27 for connecting the hitch platform to a towing vehicle.

Figure 4:
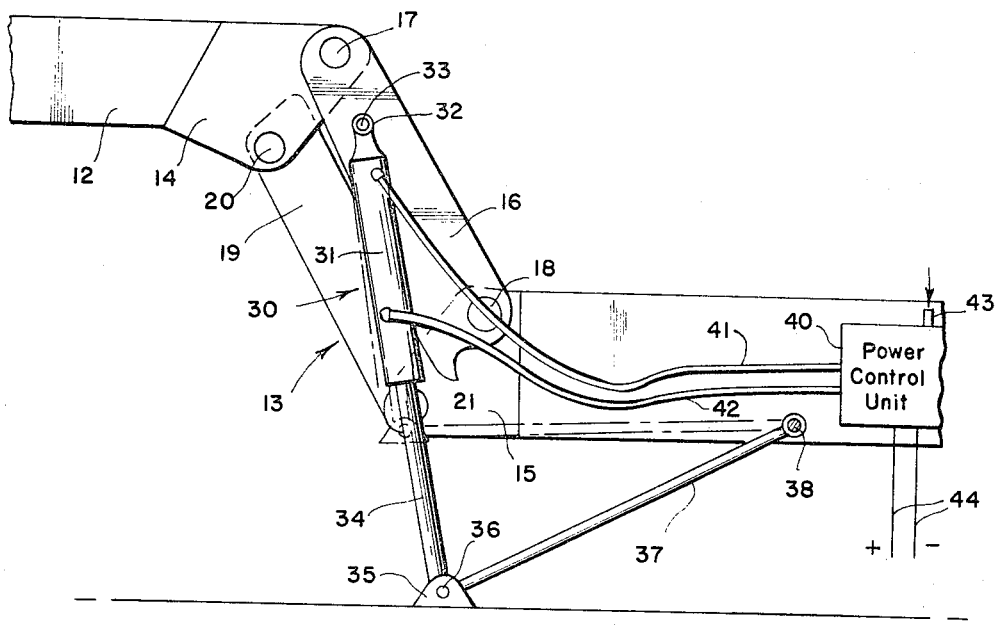
FIGURE 4 is an elevational view taken along line 4—4 of FIGURE 3.

The hitch platform 12 is connected to the flat bed 11 of the trailer by means of a parallel link system 13 which is shown in greater detail in FIGURES 3 and 4. The links of the parallel link system 13 are connected to projections 14 extending rearwardly from the hitch platform 12 and projections 15 extending forwardly from the flat bed 11.

FIGURE 3 illustrates two parallel link systems, one on each side of the trailer. However, additional systems may be provided intermediate the sides of the trailer. Each system includes at least one upper link 16 connected to projections 14 by a pivot pin 17 and to projections 15 by pivot pin 18. A lower link 19 is connected to projections 14 by pivot pin 20 and to projections 15 on pivot pin 21.

A stop pin 26 may be provided for engagement in stop grooves 25 on upper links 16 to hold the hitch platform in the raised position.

A power mechanism 30 is mounted on the trailer in the area of the parallel link systems 13. There may be only a single power mechanism 30 although in a preferred embodiment of the invention two power mechanisms 30 will be provided, one on each side of the trailer. If additional parallel link systems 13 are provided intermediate the sides of the trailer it would also be possible to employ an additional power mechanism 30 for each system.

Referring in particular to FIGURE 4, the power mechanism 30 includes an extensible link comprising a fluid pressure cylinder 31, for example a hydraulic cylinder, and a piston 34. The cylinder 31 is pivotally connected at an upper portion 32 on a pin 33 connected to an upper link 16 for pivotal movement of the cylinder 31 in a plane parallel to the plane of the upper link 16. The piston 34 is mounted within and cooperates with the cylinder 31, the piston 34 having a shoe 35 mounted thereon and the piston 34 being pivotally connected at its lower portion thereof on a pivot rod 36 to the forward end of a connecting rod 37 so that the piston 34 is capable of pivotal movement in the same plane in which the cylinder 31 is capable of moving. The connecting rod 37 is pivotally connected at its rearward end about a rod 38 which is fixed to the trailer bed 11 at 39. See FIGURE 3.

To raise the hitch platform 12 relative to the flat bed 11 or to raise both the hitch platform 12 and the flat bed 11 together, fluid under pressure is introduced into the cylinder 31 to extend the piston 34 relative to the cylinder 31. Conversely, to lower the hitch platform 12 relative to the flat bed 11 or to lower both the hitch platform 12 and the flat bed 11 together the pressure fluid is removed from the cylinder 31.

A power control unit 40 is mounted on the flat bed trailer 11 and connected to the cylinder 31 through fluid lines 41 and 42. The power control unit may be of any suitable construction. In FIGURE 4 it is assumed that the unit 40 includes a hydraulic pump for supplying and removing liquid under pressure along line 41. This pump may in turn be controlled by compressed air from the compressed air system of the towing vehicle which may be delivered to the unit 40 along line 43. Suitable valves for controlling the flow of compressed air to and from the pump may in turn be controlled manually or by electrical energy from the towing vehicle delivered to the valve along wires 44. As another possible alternative, the pump may not be necessary as there may be a power supply of liquid already present in the towing vehicle or on the trailer or it may be desired to deliver the compressed air directly to the cylinder 31. In this situation, the pump would be eliminated from the power control unit 40 and the fluid line 41 would be connected directly to the said available source. A valve could then be controlled manually or electrically along wires 44 to control the flow of this available pressure fluid to and from the cylinder 31.

FIGURE 5 illustrates schematically one possible arrangement for the mode of operation wherein a high pressure hydraulic liquid is supplied to and from the cylinder 31, the hydraulic pump is actuated by compressed air, and the flow of compressed air is controlled by an electrically operated valve. There is shown a pump unit 50 having a high pressure liquid chamber 55, a piston 56, a manifold 66 connected to a plurality of three way valves 57, one for each cylinder 31, each three way valve 57 connected along a line 63 to the reservoir 65 and along line 41 to its piston 31; and a one way inlet valve 58 connected along a line 64 to the reservoir 65. To expand the link 31, 34 the piston 56 is lowered, liquid from the chamber 55 is forced through valve 57, and line 41 into cylinder 31 to move the piston 34 downwardly. When link 31, 34 is contracted the pressure liquid flows along line 41 and through valve 57 and line 63 to the reservoir 65. To recharge the pump the piston 56 is raised and liquid is drawn in to the chamber 55 from reservoir 65 through line 64 and valve 58. Piston 56 is rigidly affixed to a piston 52 movable in air chambers 51 and 53. Upward and downward movement of the piston 56 is provided by supplying high pressure compressed air from line 43 through control valve 54 to the upper chamber 51 to lower the piston 56 or to the lower chamber 53 to raise the piston 56. It will be noted that the area of the reaction surfaces on piston 52 is greater than that on the bottom of piston 56. This is desirable in order to provide power amplification from the compressed air portion of the pump 50 to the hydraulic portion of the pump 50, that is, a smaller force being necessary to act on the greater surfaces on piston 52 to cause movement of the piston 56 against the force of the liquid in chamber 55.

Control valve 54 may be any suitable control valve and may be controlled manually or electrically through wires 44. This valve will have at least three positions, a first position for supplying compressed air to chamber 51 while draining air from chamber 53, a second position for supplying high pressure air to chamber 53 while draining air from chamber 51 and a third position for closing all of the passages so that no air can flow therebetween.

The operation of the invention is as follows. As noted in FIGURE 1 and FIGURE 2 the trailer of the present invention has three main positions. The first position is that which the trailer assumes during travel. As shown in FIGURE 1, the hitch platform 12 and flat bed 11 are raised and the piston 34 is withdrawn. In the second position the hitch platform 12 and the flat bed 11 are still raised but the piston 34 has been fully extended, as shown in dotted lines in FIGURE 1, to engage the ground. The third position, which is shown in FIGURE 2, is the loading position. Here both the hitch platform 12 and the flat bed 11 are lowered to the ground and the piston 34 is withdrawn within the cylinder 31.

Initially in the traveling position, the hitch platform 12 rests on a towing unit. Since the hydraulic pressure fluid in cylinder 31 is employed only to urge the piston 34 downwardly, and not upwardly, it is necessary to provide an additional means for urging the piston 34 upwardly. To this end compressed air is directed from line 43 through valve 60 along line 42 to a portion of cylinder 31 below the head of piston 34. There may be a valve 60 for each cylinder 31 and these valves may be controlled manually or electrically along wires 44. With this arrangement it is possible to contract any cylinder 31 separately by directing compressed air through a valve 60 and a line 42 to a cylinder 31, while at the same time opening the valve 57 associated with that cylinder so that the hydraulic liquid in that cylinder can flow along 41, 57 and 63 to reservoir 65. When hydraulic liquid expands the link, the compressed air below the head of piston 34 is exhausted to atmosphere through line 42 and valve 60 to line 62.

To remove the trailer from the towing unit compressed air is introduced to chamber 51 causing hydraulic fluid under pressure to be delivered along line 41 to the cylinder 31 to lower the piston 34 until the shoe 35 engages the ground. This represents an intermediate position before the hitch platform and flat bed are lowered to the ground to the loading position. However, if desired, the trailer may be left standing in this position.

To lower the hitch platform 12 and flat bed 11 from the intermediate position to the third, or loading position, high pressure fluid is removed from the cylinder 31 by way of 41, 57 and 63 to reservoir 65 so that the hitch platform 12 and the flat bed 11 are lowered together under the force of gravity and under the force of compressed air along line 42 to the lower part of cylinder 31 until the forward end of the flat bed 11 rests on the ground after which the hitch platform 12 moves forward toward the ground as far as permitted by the link system 13 or until it engages the ground.

It will be observed that each cylinder 31 may be separately controlled by its own valve 57 and 60 to allow independent control of each cylinder 31 if desired. This feature is extremely useful, for example, when raising and lowering the hitch platform and trailer on an uneven terrain.

In some instances it may be desirable to move the hitch platform 12 downwardly relative to the flat bed 11 before the flat bed 11 touches the ground. To accomplish this one need only place a support block under the bed 11 so that as the pressure fluid is removed from the cylinder 31, only the hitch platform 12 will be free to move downwardly.

To lift the hitch platform 12 and flat bed 11 from the loading position to the travelling position, the extensible link is again expanded. First the lighter hitch platform will rise until it reaches its highest point. Then the hitch platform and bed will rise together as a unit until the first position is reached. The hitch platform is then engaged with a travelling vehicle and fluid is removed from cylinder 31 to allow the piston 34 to be withdrawn into the cylinder 31.

The relative movement of the various links are shown in FIGURES 6A, 6B, and 6C. FIGURE 6A illustrates the position of the links in the first position, FIGURE 6B in the second position and FIGURE 6C in the third position. It can be seen that in each of the instances shown in the figures, link 16 is free to move only in direction A rotating about the pin 18. However, the extensible link 31, 34, which is pivotally connected to the link 16, is free to move only in direction B, rotating about the point 36. Thus, movement of the link 16 will be prohibited in any of the three positions as long as the link 31, 34 is held stationary.

Although a preferred embodiment of the invention has been illustrated and described in detail, it is to be understood that the invention is capable of numerous modifications and variations without departing from the spirit and scope of the invention which is defined in the appended claims.

I claim:

1. In a folding gooseneck trailer having a bed, a hitch platform and a pivotable connecting means for connecting said hitch platform to said bed, said connecting means comprising at least one pair of generally parallel rigid connecting links extending in a direction from the platform to the bed, each link of the pair being pivotally connected to both the bed and the platform for movement about axes generally transverse to said direction, wherein the position of the platform, relative to the bed, is dependent upon the angular positions of the connecting links about their said axes, a power actuated extensible and retractable link connected at one end to one of said connecting links for pivotal movement about an axis generally transverse to said direction, and the other end of the extensible and retractable link adapted to engage the ground, a rigid connecting rod pivotally connected at one end to the bed and pivotally connected at its other end to the said other end of the extensible and retractable link, the two said pivot connections of said connecting rod permitting movement of the rod about axes generally transverse to said direction, whereby when the extensible link is in its fully extended position and its said other end engages the ground, the platform is held in a raised position relative to the bed, and whereby when the extensible link is in its fully retracted position and when the platform is not supported by other support means, the platform assumes a lowered position to act as a ramp for loading goods onto the trailer.

2. In a trailer as claimed in claim 1, said extensible link including a pressure fluid actuated piston and cylinder unit having an upper portion and a lower portion, and including power supply means for supplying fluid under pressure to said unit and for removing fluid from said unit, said upper portion including said pivotal connection to one of said connecting links, and said lower portion including said pivotal connection to the said other end of the rigid connecting rod.

3. In a trailer as claimed in claim 2, wherein said at least one pair of generally parallel links includes an upper link and a lower link, and wherein the said upper portion of the said piston and cylinder unit is connected to the upper link of the pair.

4. In a trailer as claimed in claim 2, said piston and cylinder unit being a hydraulic piston and cylinder unit and said power supply means including a means for supplying liquid under pressure to said unit to move the piston away from the cylinder thereby raising the hitch platform, a means for removing liquid from the cylinder to allow the piston to be withdrawn into the cylinder thereby allowing the hitch platform to be lowered under the force of gravity acting thereon.

5. In a trailer as claimed in claim 1, said extensible link being of sufficient length such that in its extended condition its other end engages the ground when the said hitch platform is in its raised position and the said bed is substantially horizontal.

6. In a folding gooseneck trailer having a bed, a hitch platform and a pivotable connecting means connecting said hitch platform to said bed, a power actuated means including an extensible link connected at one end to said pivotable connecting means, its other end adapted to engage the ground and said other end also being pivotally connected to the forward end of a connecting rod, the other end of the connecting rod being pivotally connected to the said bed, and a power supply means operative to supply power to said power actuated means to selectively extend or contract the said extensible link, said extensible link including a pressure fluid actuated piston and cylinder unit having an upper portion and a lower portion, said power supply means including a means for supplying fluid under pressure to said unit and removing fluid from said unit, said upper portion being pivotally connected to said pivotable link means, and said lower portion being pivotally connected to the said forward end of the connecting rod, said pivotal link means including at least one pair of generally parallel links including an upper link and a lower link, each link of the pair being pivotally connected to both the said hitch platform and the said bed, and the said upper portion of the said piston and cylinder unit being connected to the upper link of the pair.

7. In a trailer as claimed in claim 6, said piston and cylinder unit being a hydraulic piston and cylinder unit and said power supply means including a means for supplying liquid under pressure to said unit to move the piston away from the cylinder thereby raising the hitch platform, a means for removing the liquid from the cylinder to allow the piston to move toward the cylinder thereby allowing the hitch platform to be lowered under the force of gravity acting upon the said hitch platform.

References Cited
UNITED STATES PATENTS

| | | | |
|---|---|---|---|
| 2,656,195 | 7/1948 | Martin. | |
| 2,687,225 | 8/1954 | Martin. | |
| 2,895,746 | 7/1959 | Swaney | 214—506 XR |
| 2,676,783 | 4/1954 | Rogers | 214—506 XR |

ALBERT J. MAKAY, *Primary Examiner.*

U.S. Cl. X.R.

280—425, 475